United States Patent Office 3,259,473
Patented July 5, 1966

3,259,473
DISSOLUTION OF PLUTONIUM
Horace H. Hopkins, Jr., and Richard S. Kingsley, Richland, and Eben La Mont Conner, Jr., Yakima, Wash., assignors to the United States of America as represented by the United States Atomic Energy Commission
No Drawing. Filed Oct. 2, 1963, Ser. No. 321,991
1 Claim. (Cl. 23—316)

The invention described herein was made in the course of, or under, a contract with the United States Atomic Energy Commission.

This invention deals with the dissolution of plutonium metal and the production of pure plutonium salts.

Plutonium metal has been dissolved heretofore by immersing it in a rather concentrated hot mixture of nitric acid and hydrofluoric acid, namely 10 to 16 M in nitric acid and 0.1 to 1 M in hydrofluoric acid.

This method used heretofore has the drawback that the high concentration of hydrofluoric acid causes severe corrosion and that, in order to avoid it, aluminum nitrate had to be added to the acid mixture to complex the fluoride anions. The presence of a high concentration of aluminum cations, in turn, makes precipitation of plutonium, for instance, as the oxalate unfeasible, because the aluminum would precipitate together with the plutonium, so that a pure plutonium compound is not obtained.

It is an object of this invention to provide a process for the dissolution of plutonium in nitric acid to which only an extremely small concentration of hydrofluoric acid needs to be added.

It is also an object of this invention to provide a process for the dissolution of plutonium in nitric acid in which the acid mixture does not require the addition of aluminum ions.

It is another object of this invention to provide a process for the dissolution of plutonium in nitric acid in which no oxide films are formed on the plutonium during dissolution and which proceeds at a satisfactorily high rate.

It is furthermore an object of this invention to provide a process for the dissolution of plutonium in nitric acid which requires lower nitric acid concentrations than the abovedescribed process used heretofore.

It is finally also an object of this invention to provide a process for the dissolution of plutonium in nitric acid whereby plutonium salt solutions are obtained from which the plutonium can readily be precipitated in pure form.

It has been found that, if plutonium is dissolved in nitric acid under reducing conditions, hydrofluoric acid needs to be added in very small, catalytic, quantities only in order to obtain satisfactorily fast dissolution. Hydrazine is the preferred reducing agent for this purpose, because it does not add any extraneous ions.

The process of this invention comprises immersing plutonium metal in nitric acid containing hydrazine and catalytic amounts of fluoride anions and heating the system, preferably to between 50 and 100° C.

The acid-solvent mixture best contains the nitric acid in a concentration of between 1 and 5 M, the hydrazine in a concentration of between 0.1 and 2 M and the fluoride anion in a concentration of between 0.0001 and 0.01 M. The fluoride anions are preferably added in the form of hydrofluoric acid, because of the absence of extraneous ions. The acid-solvent can be used until the plutonium nitrate concentration has reached at least a concentration of 100 grams of plutonium per liter.

The plutonium can be readily precipitated from the solution obtained, for instance with oxalic acid, whereby pure plutonium oxalate is obtained.

In the following, an example is given for illustrative purposes.

Example

A piece of plutonium, 0.67 mg., was immersed in 23.7 ml. of an aqueous mixture 3 M in nitric acid, 1.5 M in hydrazine and 0.001 M in hydrofluoric acid at boiling temperature. The penetration rate was 0.36 mil/min. and the resulting solution, after 20 minutes, contained 29.5 grams of plutonium per liter.

It will be understood that the invention is not to be limited to the details given herein but that it may be modified within the scope of the appended claim.

What is claimed is:

A process of dissolving plutonium, comprising immersing the plutonium in aqueous nitric acid having a concentration of between 1 and 5 M, containing hydrazine in a concentration of between 0.1 and 2M and hydrofluoric acid in a concentration of between 0.0001 and 0.01 M, and heating the metal-acid system to a temperature within the range of between 50 and 100° C.

References Cited by the Examiner
UNITED STATES PATENTS 2,942,938   6/1960   Facer et al. _____ 23—14.5
2,996,352   8/1961   Barrick et al. _____ 23—14.5

LEON D. ROSDOL, Primary Examiner.
BENJAMIN R. PADGETT, Examiner.
S. TRAUB, Assistant Examiner.